(12) United States Patent  
Batchu et al.

(10) Patent No.: US 9,338,716 B2  
(45) Date of Patent: May 10, 2016

(54) PIECEWISE AGGREGATION OF OVERHEAD MESSAGING SETS

(71) Applicant: QUALCOMM Incorporated, San Diego, CA (US)

(72) Inventors: Bhaskara Viswanadham Batchu, Hyderabad (IN); Troy Russell Curtiss, Boulder, CO (US); Stanley Suyi Tsai, Frederick, CO (US); Gaurav Goyal, Hyderabad (IN); Aditya Kailash Bohra, Gujarat (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/472,005

(22) Filed: Aug. 28, 2014

(65) Prior Publication Data

US 2015/0334621 A1    Nov. 19, 2015

Related U.S. Application Data

(60) Provisional application No. 61/993,803, filed on May 15, 2014.

(51) Int. Cl.
| | |
|---|---|
| *H04W 36/00* | (2009.01) |
| *H04W 36/22* | (2009.01) |
| *H04W 36/24* | (2009.01) |
| *H04W 76/06* | (2009.01) |
| *H04W 52/02* | (2009.01) |

(Continued)

(52) U.S. Cl.
CPC .............. *H04W 36/22* (2013.01); *H04W 36/24* (2013.01); *H04W 48/18* (2013.01); *H04W 52/0203* (2013.01); *H04W 76/068* (2013.01); *H04W 36/0088* (2013.01); *H04W 36/0094* (2013.01); *H04W 36/14* (2013.01); *H04W 76/045* (2013.01); *H04W 88/06* (2013.01)

(58) Field of Classification Search
CPC ... H04W 36/22; H04W 36/24; H04W 76/068; H04W 52/0203
USPC .......................................................... 455/436
See application file for complete search history.

(56) References Cited

U.S. PATENT DOCUMENTS

| | | |
|---|---|---|
| 2006/0176870 A1 | 8/2006 | Joshi et al. |
| 2009/0180451 A1 | 7/2009 | Alpert et al. |

(Continued)

OTHER PUBLICATIONS

International Search Report and Written Opinion—PCT/US2015/028274—ISA/EPO—Aug. 31, 2015. (11 total pages).

*Primary Examiner* — Nader Bolourchi

(74) *Attorney, Agent, or Firm* — Arent Fox LLP

(57) ABSTRACT

Methods and apparatuses are presented for piecewise aggregation of overhead messages. According to a method that is presented, that the method can include starting a timer having a time period during which a first radio access technology (RAT) of the UE attempts to obtain overhead messages from a cell. The method can also include obtaining, at a radio resource of the UE and during the time period, a first portion of the overhead messages from the cell. In addition, the method may include determining that the timer has expired and handing over the radio resource to a second RAT of the UE when the timer has expired. The method also may include aggregating the first portion of the overhead messages with a second portion of the overhead messages. Other aspects, embodiments, and features are also claimed and described.

21 Claims, 9 Drawing Sheets

(51) Int. Cl.
*H04W 48/18* (2009.01)
*H04W 36/14* (2009.01)
*H04W 76/04* (2009.01)
*H04W 88/06* (2009.01)

(56) References Cited

U.S. PATENT DOCUMENTS

| | | |
|---|---|---|
| 2010/0329210 A1 | 12/2010 | Shirota et al. |
| 2012/0294173 A1 | 11/2012 | Su et al. |
| 2013/0172023 A1 | 7/2013 | Chan et al. |
| 2013/0210421 A1 | 8/2013 | Mohseni et al. |
| 2013/0244657 A1 | 9/2013 | Wang et al. |
| 2013/0260758 A1 | 10/2013 | Zhao et al. |
| 2013/0286851 A1* | 10/2013 | Moser ............... H04W 24/02 370/241.1 |
| 2013/0303240 A1* | 11/2013 | Sanka ............... H04B 1/3816 455/558 |
| 2014/0071939 A1 | 3/2014 | Yang et al. |
| 2015/0057046 A1* | 2/2015 | Challa ............... H04W 4/001 455/558 |

\* cited by examiner

PIECEWISE AGGREGATION OF OVERHEAD MESSAGING SETS

CROSS REFERENCE TO RELATED APPLICATION

The present Application for Patent claims priority to Provisional Application No. 61/993,803, entitled "Method for Efficient Piecewise Aggregation of Overhead Messaging Sets," filed May 15, 2014, and expressly incorporated by reference herein for all applicable purposes

TECHNICAL FIELD

The technology discussed below relates to wireless communications, and more particularly, to aggregation of overhead messaging sets. Implementation of aspects of the technology can enable and provide improved network communication and user experience.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Additionally, some user equipment (UE) are configured to facilitate communication via multiple unique radio access technologies (RATs) using a shared radio resource. For example, some UEs may support communication according to LTE and 1×RATs, though the UE may support one or more other RATs. A problem may arise, however, when a multi-RAT-compatible UE (e.g., which is operating via a 1×RAT) performs idle handoff between cells to which it has not previously visited. Per current standard operation, the UE collects overhead messages from a new active cell to which the UE is handed off. In some examples, this overhead message collection process can last up to 1.28 seconds, and in scenarios involving fading and/or bad network conditions, the overhead message collection process may last even longer. In other words, if the 1×RAT enters a handoff scenario, it could end up keeping the radio resource for two seconds or more.

In some networks, however, an LTE fade timer, which governs when a radio link failure is declared, is programmed to have a time period of less than one second. Thus, when the 1×RAT holds the radio resource for longer than the LTE fade timer (e.g., two seconds or more), the LTE network may declare radio link failure prematurely simply due to the 1×RAT collecting overhead data for a target cell of the handoff. Such radio link failures on the LTE RAT can lead to significant throughput degradation and can have an overall negative effect on device performance.

BRIEF SUMMARY OF SOME EXAMPLES

The following presents a summary of one or more aspects of the disclosure in-order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure describes example methods and apparatuses for piecewise aggregation of overhead messaging sets. For example, the present disclosure presents an example method of managing a UE, which may include starting a timer having a time period during which a first radio access technology of the UE attempts to obtain overhead messages from a cell. In addition, the example method may include obtaining, at a radio resource of the UE and during the time period, a first portion of the overhead messages from the cell. Additionally, the example method may include determining that the timer has expired. In addition, the example method may include handing over the radio resource to a second RAT of the UE when the timer has expired, and aggregating the first portion of the overhead messages with a second portion of the overhead messages.

Moreover, the present disclosure presents an example apparatus for managing a UE, which may include a radio resource manager, comprising hardware for managing the radio resource. In some examples, the radio resource manager may be configured to start a timer having a time period during which a first radio access technology of the UE attempts to obtain overhead messages from a cell. Additionally, the radio resource manager may be configured to obtain, from the radio resource and during the time period, a first portion of the overhead messages from the cell. Moreover, the radio resource manager may be configured to determine that the timer has expired, and hand over the radio resource to a second RAT of the UE when the timer has expired. In addition, the radio resource manager may be configured to aggregate the first portion of the overhead messages with a second portion of the overhead messages.

In a further aspect, the present disclosure presents an example non-transitory computer-readable medium storing instructions, that when executed by a processor, cause the processor to start a timer having a time period during which a first radio access technology of the UE attempts to obtain overhead messages from a cell. In addition, the example computer-readable medium may store instructions, that when executed by a processor, cause the processor to obtain, from the radio resource and during the time period, a first portion of the overhead messages from the cell. Furthermore, the example computer-readable medium may store instructions, that when executed by a processor, cause the processor to determine that the timer has expired. Moreover, the example computer-readable medium may store instructions, that when executed by a processor, cause the processor to hand over the radio resource to a second RAT of the UE when the timer has expired and to aggregate the first portion of the overhead messages with a second portion of the overhead messages.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure presents methods and apparatuses for improved management of a radio resource (e.g., radio frequency (RF) chain, transceiver, radio, related circuitry, etc.) shared by a plurality RATs (e.g., a first RAT and a second RAT) in a multi-RAT UE. In an aspect, the UE may be configured to fragment the overhead message collection cycle associated with a first RAT of the UE, such that the first RAT does not hold the RF chain for a duration that might be problematic to other RATs of the UE. For example, where a second RAT of the UE is engaged in a call or data session, if the radio resource is handed over to the first RAT of the UE for a relatively long period of time (e.g., to receive overhead messages for a target cell for handover), the call or data session may be lost due to radio link failure. Thus, in an aspect of the present disclosure, the overhead message collection process of the first RAT (e.g., a 1×RAT) may be fragmented into a plurality of reception periods such that the second RAT of the UE (e.g., an LTE or GSM RAT) may utilize the radio resource for a period of time sufficient to avoid radio link failure associated with the call or data session of the second RAT.

For example, the nominal overhead collection cycle on most CDMA networks (which include 1×RATs) is around 1.28 seconds, and full overhead message collection can take longer if channel conditions are bad. Thus, according to the present disclosure, a multi-RAT UE may fragment the legacy overhead message collection time period into several shorter periods and may aggregate the overhead messages received during each of the shorter periods to avoid radio link failure on a second RAT of the UE (e.g., the LTE RAT). In doing so, the UE may utilize a timer having an associated maximum allowable overhead message collection time period for each shorter overhead message collection period, and may hand over the shared radio resource of the UE to a second RAT (e.g., LTE) after the time period has expired. Subsequent to the handover to the second RAT, the next wakeup/overhead message collection period for the first RAT would be staggered in timing such that remaining uncollected overhead messages for the target cell would be obtained during one or more subsequent collection periods and aggregated.

Figure 1:
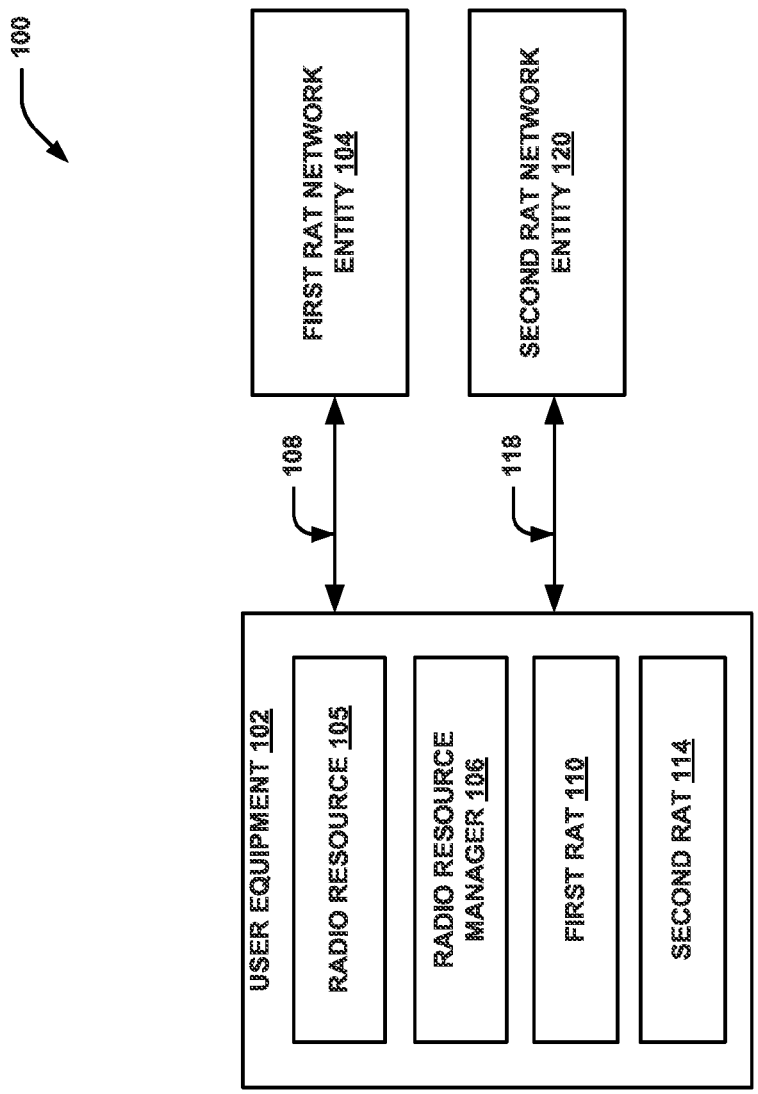
FIG. 1 is a block diagram illustrating an example wireless communications system according to some embodiments.

FIG. 1 is a schematic diagram illustrating a system 100 for wireless communication, according to an example configuration. FIG. 1 includes an example first RAT network entity 104 and a second RAT network entity 120, which may communicate wirelessly with one or more UEs 102 over one or more wireless communication channels 108 and 118, respectively. In an aspect, the one or more wireless communication channels 108 and 118 may include, in a non-limiting aspect, one or more data communication channels and control channels that may carry one or more overhead messages (e.g., messages including neighbor cell lists, system parameters, access parameters, etc.). Furthermore, the radio resource 105 of the UE may include, but is not limited to, a receiver, transmitter, antenna, transceiver, communications device, hardware, or circuitry configured to transmit, receive, decode, and/or otherwise process wireless signals of a first RAT 110 and/or second RAT 114.

UE 102 may comprise any type of mobile device, such as, but not limited to, a smartphone, cellular telephone, mobile phone, laptop computer, tablet computer, or other portable networked device. In addition, UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a device associated with the internet of things (IoT), a machine-to-machine (M2M) device, a remote terminal, a handset, a terminal, a user agent, a mobile client, a client, an entertainment device, a vehicular component, or some other suitable terminology. In general, UE 102 may be small and light enough to be considered portable and may be configured to communicate wirelessly via an over-the-air (OTA) communication link using one or more OTA communication protocols described herein.

Additionally, in some examples, UE 102 may be configured to facilitate communication on two or more separate networks via two separate RATs, such as, but not limited to, a first RAT 110 and a second RAT 114. While in idle mode, the first RAT 110 may be periodically given priority to a shared radio resource of the UE 102 to receive overhead messages from the first RAT provider network via first RAT network entity 104 over a communication channel 108. In an aspect, communication channels 108 and 118 may comprise any OTA communication channel, including, but not limited to, one or more data or control communication channels operating according to specifications promulgated by 3GPP and/or 3GPP2, which may include first generation, second generation (2G), 3G, 4G, etc. wireless network communication protocols. For example, each of first RAT 110 and second RAT 114 may be associated with one or more radio access technology (RAT) standards and may be configured to communicate via these RAT standards with one or more of first RAT network entity 104 and second RAT network entity 120, which may also be configured to communicate according to the RAT(s) utilized by the subscriptions of UE 102.

The RAT, modulation, and multiple access scheme employed by each of first RAT 110 and second RAT 114 may vary depending on the particular RAT standard being deployed. For example, in an aspect, one of first RAT 110 and second RAT 114 may be configured to communicate via LTE communication protocol. In LTE, orthogonal frequency-division multiplexing (OFDM) is used on the downlink (DL) and single-carrier frequency division multiple access (SC-FDMA) is used on the uplink (UL) to support both frequency division duplexing (FDD) and time division duplexing (TDD). As those skilled in the art will readily appreciate from the detailed description to follow, the various concepts presented herein are well suited for LTE and similar applications. However, these concepts may be readily extended to other telecommunication standards or RATs employing other modulation and multiple access techniques, any of which may likewise be utilized as a subscription communication standard or RAT of each of first RAT 110 and second RAT 114.

By way of example, these RATs may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These RATs may also include one or more of Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard(s) and the multiple access technology employed by first RAT 110 and second RAT 114 (and/or other subscriptions that may be included in UE 102 but not shown in FIG. 1) will depend on the specific application and the overall design constraints imposed on the system 100. In one example of the present disclosure, first RAT 110 may comprise a 1×RAT and second RAT 114 may comprise an LTE RAT. For purposes of the present disclosure, a 1×RAT may comprise any CDMA RAT, including, but not limited to, CDMA2000, 1×RTT, 1×EV-DO, 1×EVDV, or any other CDMA-based RAT.

In addition, UE 102 may include a radio resource manager 106, which may be configured to manage the allocation of radio resource 105 (e.g., receiver, transmitter, transceiver, and related circuitry, etc.) between multiple RATs or subscriptions (e.g., first RAT 110 and second RAT 114). Furthermore, in some examples, UE 102 may comprise a multi-subscriber-identity-module (multi-SIM) UE comprising a plurality of subscriber identity modules (SIMs), each of which may manage one or more subscriptions to wireless networks operating according to one or more RATs. For example, UE 102 may comprise a dual-SIM, dual-standby (DSDS) UE, dual-SIM, dual-active (DSDA) UE, triple SIM, triple standby (TSTS), QuadSIM UE, OctaSIM, or a UE having any number of unique SIM cards and/or subscriptions.

Furthermore, first RAT network entity 104 and second RAT network entity 120 of FIG. 1 may comprise one or more of any type of network module. These can include, for example, an access point, a macro cell, including a base station (BS), node B, eNodeB (eNB), a relay, a peer-to-peer device, an authentication, authorization and accounting (AAA) server, a mobile switching center (MSC), a mobility management entity (MME), a radio network controller (RNC), or a small cell. The term "small cell" may refer to an access point or to a corresponding coverage area of the access point, when the access point in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. A small cell may include, but is not limited to, an apparatus such as a BS, an access point, a femto node, a femtocell, a pico node, a micro node, a Node B, eNB, home Node B (HNB) or home evolved Node B (HeNB). Therefore, the term "small cell," as used herein, refers to a relatively low transmit power and/or a relatively small coverage area cell as compared to a macro cell. Additionally, first RAT network entity 104 and second RAT network entity 120 may communicate with one or more other network entities of wireless and/or core networks.

Additionally, system 100 may include any network type, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet. Such networks may comprise a Wideband Code Division Multiple Access (W-CDMA) system, and may communicate with one or more UEs 102 according to this standard and/or any other RAT introduced above. Thus, as those skilled in the art will readily appreciate, various aspects described throughout this disclosure may be extended to other telecommunication systems, RATs, network architectures and communication standards.

By way of example, various aspects may be extended to other communication systems. These can include, for example, Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems, such as the RATs introduced above in reference to each of first RAT 110 and second RAT 114. The actual telecommunication standard, network architecture, and/or communication standard employed will depend on the specific application and the overall design constraints imposed on the system 100. In addition, the various devices coupled to the network(s) (e.g., UEs 102, first RAT network entity 104, second RAT network entity 120) may be coupled to a core network via one or more wired or wireless connections.

Figure 2:
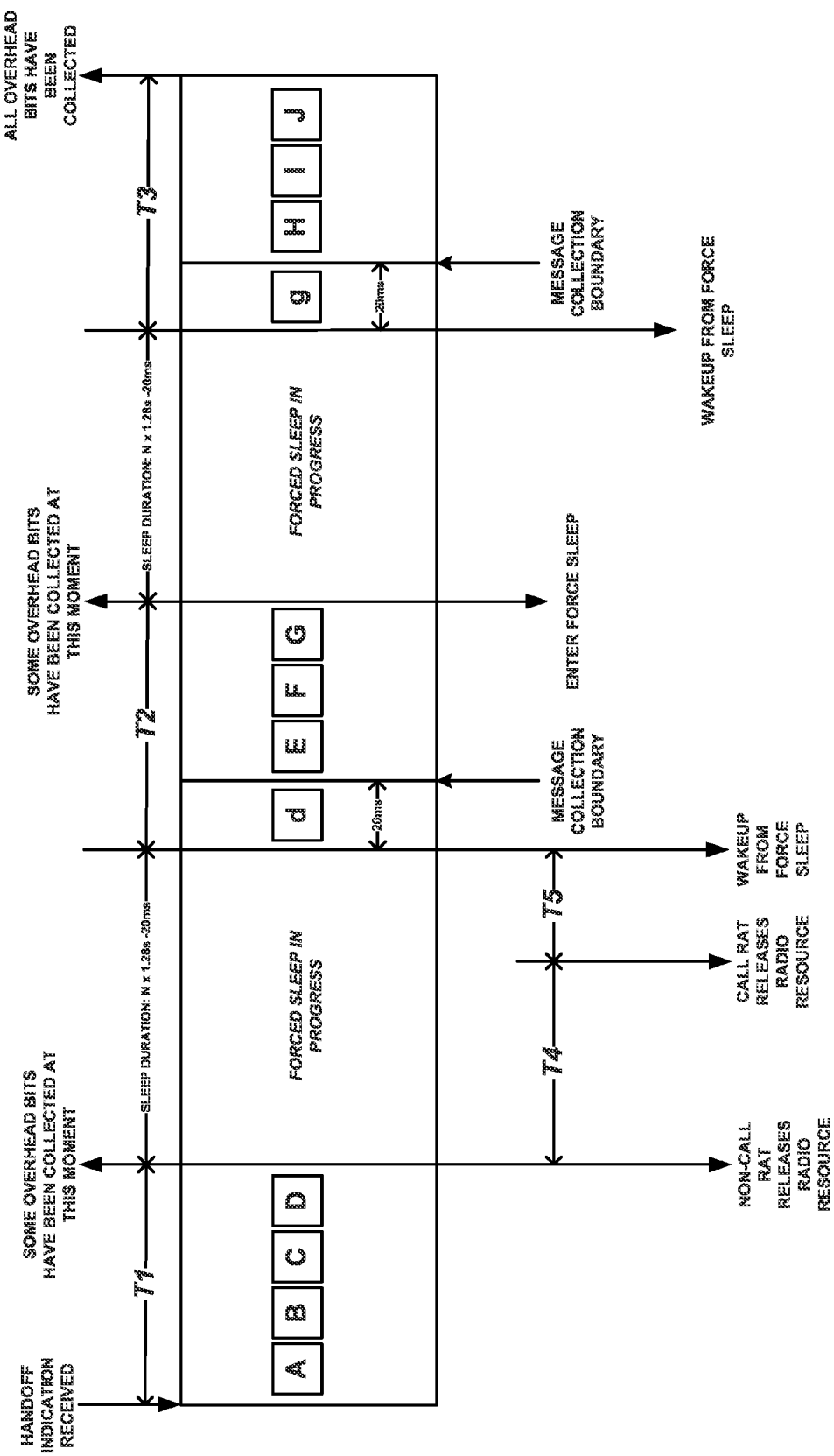
FIG. 2 is a timing diagram illustrating an example operational scenario of a multi-RAT UE according to some embodiments.

FIG. 2 presents an example timing diagram for the operation of a radio resource of a multi-RAT UE 102 according to the present disclosure. As shown in FIG. 2, a overhead message collection or monitoring period for the first RAT 110 may be fragmented in to a plurality of small periods T1, T2, and T3. The time periods each may have a duration short enough to avoid radio link failure on another, second RAT 114 of the UE 102. For example, at the outset of a time period T1, the UE 102 may receive a handoff indication indicating that a first RAT 110 (e.g., 1×) is to be handed over to a particular cell, which may be referred to herein as a "target cell" for the handover. In an aspect, the target cell may transmit overhead messages (shown in FIG. 2 as overhead messages A-J). In an aspect, during T1, a shared radio resource (or "chain") may be tuned to a frequency of a channel associated with the target cell upon which the overhead messages are transmitted. T1 may have a maximum time period for which the first RAT 110 may hold the radio resource 105 so as to allow a second RAT 114 (e.g., LTE) of the UE 102 to perform required operations and/or perform a call without declaring a radio link failure. Thus, during the time period associated with T1, only a portion of all of the overhead messages transmitted by the target cell may be received by the radio resource while it is held by the first RAT. In some examples described herein, the portions received during the separate time periods of FIG. 2 (i.e., T1, T2, and T3) may be referred to as a first portion of the overhead messages, a second portion of the overhead messages, and the like.

In an aspect, as illustrated in FIG. 2, a radio resource 105 may receive overhead messages A-D of overhead messages A-J transmitted by a cell. In some example, this cell may comprise a target cell in a cell reselection or handover associated with the first RAT 110. After the maximum time period for which the first RAT 110 may hold the radio resource 105 has elapsed at the end of T1, the first RAT 110 may be forced (for example, by radio resource manager 106 of FIG. 1) into a sleep state and the shared radio resource 105 may be handed over to the second RAT 114 at time X. For purposes of the present disclosure, this maximum time period for which the first RAT 110 may hold the radio resource 105 may correspond to a time period associated with a timer (e.g., a "force sleep timer"). In FIG. 2, time periods T1, T2, and T3 may have a duration corresponding to this time period associated with the timer.

Furthermore, at time X, the UE 102 may maintain another timer (e.g., a sleep duration timer). This other timer, or "sleep duration timer" may expire at a time that is based on an overhead message transmission periodicity of the cell from which the overhead messages are received or otherwise obtained. For example, in FIG. 2, the overhead message transmission periodicity may be once every 1.28 seconds. In some embodiments, the overheard message transmission periodicity may be multiplied by an integer N and remain at a correct time for receiving and decoding overhead messages due to the periodic nature of overhead message transmission). In other words, a cell associated with the first RAT 110 may begin transmitting its overhead message sequence every 1.28 seconds. In other embodiments, the precise overhead transmission periodicity may have any time period depending on the network or RAT of the cell. In some embodiments, the sleep duration timer may also subtract a warm-up time period, which in the non-limiting example illustrated in FIG. 2 is represented as 20 ms. The warm-up time period may be any time period as desired or required by a communication system. This warm-up time period is subtracted from the overhead message sequence time period (e.g., 1.28 seconds) to ensure that Viterbi decoder metrics of the UE 102 are converged and the chain-back bits are accounted properly in the frame starting at 1.28*N seconds; (e.g., where the overhead message channel (e.g., Forward Paging Channel (F-PCH)) does not have any tail-bits per frame, and is running in a continuous mode).

In an additional aspect, during the sleep duration of the first RAT 110, the second RAT 114 (e.g., LTE) may hold the radio resource 105 for a time period T4 and may release the radio resource 105 at time U. In some examples, the first RAT 110 may not wake up from the sleep state immediately following T4. Instead, during a time period T5 the first RAT 110 may strategically ascertain the precise wakeup point Y to coincide with the time instant in the overhead message transmission periodicity at which the first RAT 110 entered a forced sleep state at time X. In some instances, the wakeup point Y may not correspond precisely with the with the time instant in the overhead message transmission periodicity at which the first RAT 110 entered a forced sleep state at time X, but instead may wake up earlier (in FIG. 2, 20 ms earlier, for example) to allow for a warm-up period. This warm-up period may overlap briefly with a time period during a previous cycle (T1) where a portion of the overhead messages were received. For example, here, message D was received during T1, and the first RAT 110 may wake up "early," such as while a message d corresponding to the previous message D is received again.

Once the first RAT 110 wakes from the forced sleep state at time Y, the radio resource 105 may receive overhead messages E, F, and G during time period T2 before the force sleep timer expires. When the force sleep timer expires, the first RAT 110 is again forced into a sleep state, and the radio resource 105 may be handed over to the second RAT 114. The process repeats again, with the first RAT 110 waking up from the sleep state at time Z, warms up, and receives remaining overhead messages H, I, and J during time period T3. When all of the overhead messages of the target cell have been received (here, at the conclusion of T3), the radio resource 105 may be handed over to the second RAT 114 and the first RAT 110 may return to a sleep state.

Figure 3:
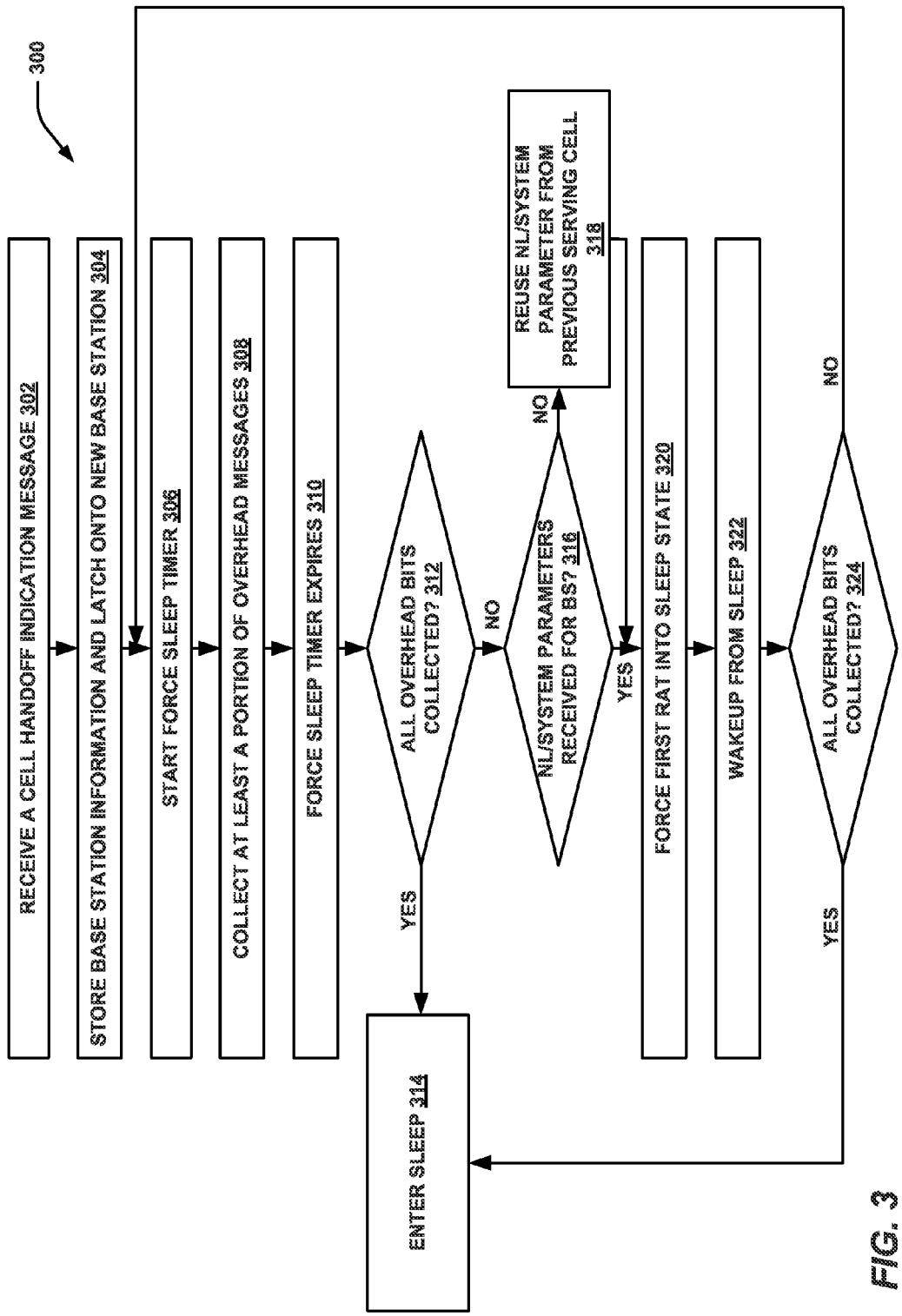
FIG. 3 is a flow diagram comprising a plurality of functional blocks of a method according to some embodiments.

FIG. 3 presents an exemplary flow diagram of a method 300 of the present disclosure that further illustrates the process of fragmented overhead message collection introduced in FIG. 2. In an aspect, the method 300 illustrated in FIG. 3 may be performed by radio resource manager 106 of FIG. 1 and/or one or more other components associated with UE 102 of FIG. 1. For purposes of the present disclosure, the term "component," "components," "module," or "modules" may comprise software, hardware, or a combination of software and hardware. For example, these terms may indicate the presence of a computer-readable medium for storing the software and a computer or processor in communication with the computer-readable medium, where the computer or processor is configured to execute the software of the computer-readable medium to perform functions associated with one or more functions or methodologies presented herein.

In an aspect, at block 302, the UE 102 (e.g., via radio resource 105) may receive an idle mode handoff indication (e.g., from a lower layer in the protocol stack) indicating that the first RAT of UE 102 is to be handed over to a particular cell, or "target cell." Based on the handoff indication, the UE 102 may store cell or base station information associated with a target cell of the handoff and may camp or otherwise latch onto (e.g., establish communication with) the new, target base station associated with the target cell at block 304. In addition, when the handoff indication is received, the UE 102 may start a timer at block 306, which may be referred to as a "force sleep timer" herein. In an aspect, the force sleep timer may govern a maximum time period during which the first RAT may hold a radio resource 105 for purposes of collecting, receiving, or otherwise obtaining overhead messages associated with the target cell. During this time period, at block 308, the UE 102 may collect a portion of the overhead messages transmitted by the target cell until the force sleep timer expires.

Upon expiry of the force sleep timer at block 310, the UE 102 or a component therein may determine whether the overhead messages associated with the target cell have been collected at block 312. In other words, at block 312, the UE or the component therein may determine whether all overhead messages are current for the new base station (BS) associated with the target cell. Where the overhead messages have been successfully received, the UE 102 may return the first RAT 110 (e.g., 1×) to sleep mode at block 314.

Where, however, only a portion of all of the overhead messages have been received (e.g., all overheads are not current), the UE 102 or a component therein may determine, at block 316, whether a neighbor cell list (NL) and/or system parameters have been received from the target cell or its associated BS. If the NL or system parameters have not been received from the target cell or its associated BS, the UE may reuse system parameters or neighbor information from a previous serving cell at block 318. Thereafter, the UE 102 may force the first RAT 110 into a sleep state (e.g., via a message to lower layers of the protocol stack) at block 320. For example, in some examples, radio resource manager 106 of FIG. 1 and/or a processor (e.g., processor 504 of FIG. 5, infra) may be configured to force the first RAT 110 into the sleep state.

Furthermore, after a sleep duration that is based on the overhead message transmission periodicity, which may be 1.28 seconds (or a multiple N thereof) where the first RAT comprises a 1×RAT and/or a wake-up time period (e.g., 20 ms), the UE may wake-up from the sleep state at block 322. Once the UE 102 has woken from the sleep state at block 322, the UE 102 or an associated component may again determine whether the overhead messages are current for the target node or associated BS at block 324. Where the overhead messages are current (e.g., all overhead messages have been received from the target cell) the UE 102 may go to sleep at block 314. Alternatively, where the overhead messages associated with the first RAT 110 have not been received, the method 300 may return to block 306 to attempt to receive any remaining overhead messages.

Figure 4:
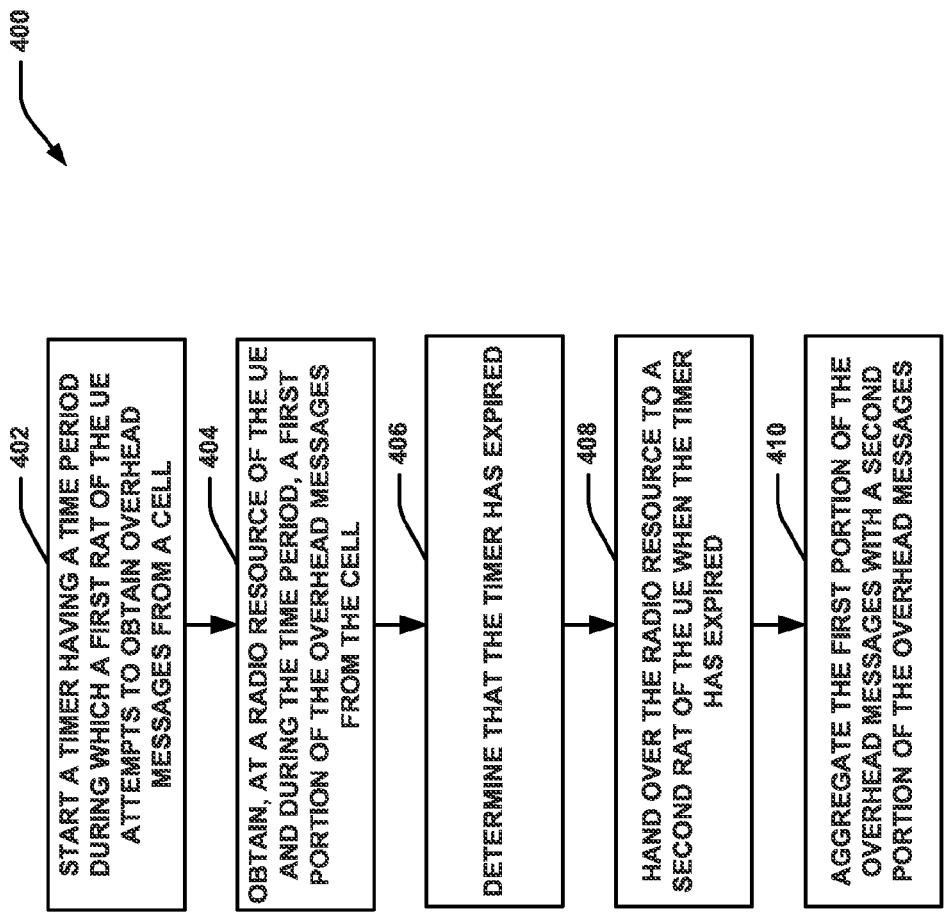
FIG. 4 is a flow diagram comprising a plurality of functional blocks of a method according to some embodiments.

FIG. 4 presents an exemplary method 400 comprising a non-limiting set of steps represented as blocks that may be performed by an apparatus described herein (e.g. user equipment 102, radio resource 105, and/or radio resource manager 106 of FIG. 1). In an aspect, method 400 may comprise a method of radio resource management in a user equipment 102, and may include, at block 402, starting a timer (e.g., a force sleep timer) having a time period during which a first RAT of the UE attempts to obtain overhead messages from a cell. In an aspect, the cell may comprise a target cell for a cell handover or cell reselection. In addition, method 400 may include, at block 404, obtaining, at a radio resource of the UE. Additionally, at block 406, method 400 may include determining that the timer has expired. Moreover, at block 408, method 400 may include handing over the radio resource to a second RAT of the UE when the timer has expired. In addition, method 400 may include, at block 410, aggregating the first portion of the overhead messages with a second portion of the overhead messages. In an aspect, the second portion of the overhead messages may be obtained before or after the time period associated with the timer, such as during a time period during which the radio resource has been handed over to the first RAT for another In addition, though not specifically represented in a functional block of FIG. 4, method 400 may include one or more further steps or processes. For example, method 400 may include any steps or processes outlined in reference to the method 300 outlined in FIG. 3. The method 400 may further include handing the radio resource back to the first RAT after a sleep duration associated with the first RAT. In an aspect, the sleep duration may be based on an overhead message transmission periodicity associated with the target cell. Moreover, method 400 may include determining whether the overhead messages for the target cell have been obtained by the UE 102 and reverting to a maintenance overhead message obtaining procedure based on determining that all of the overhead messages have been obtained. In an aspect, such a maintenance overhead message obtaining procedure may comprise a procedure that monitors for changes in the overhead messages (e.g., by checking a sequence ID value associated with the obtained overhead messages) rather than performing the time-consuming overhead collection process itself. Furthermore, the first RAT 110 may comprise a 1×RAT and the second RAT 114 may comprise a Long Term Evolution RAT. In addition, method 400 may include forcing the first RAT 110 to enter a sleep state upon determining that the timer (e.g., the force sleep timer) has expired. Furthermore, in some examples, method 400 may include obtaining a second portion of the overhead messages during a second time period, and aggregating the portion of the overhead messages and the second portion of the overhead messages.

Figure 5:
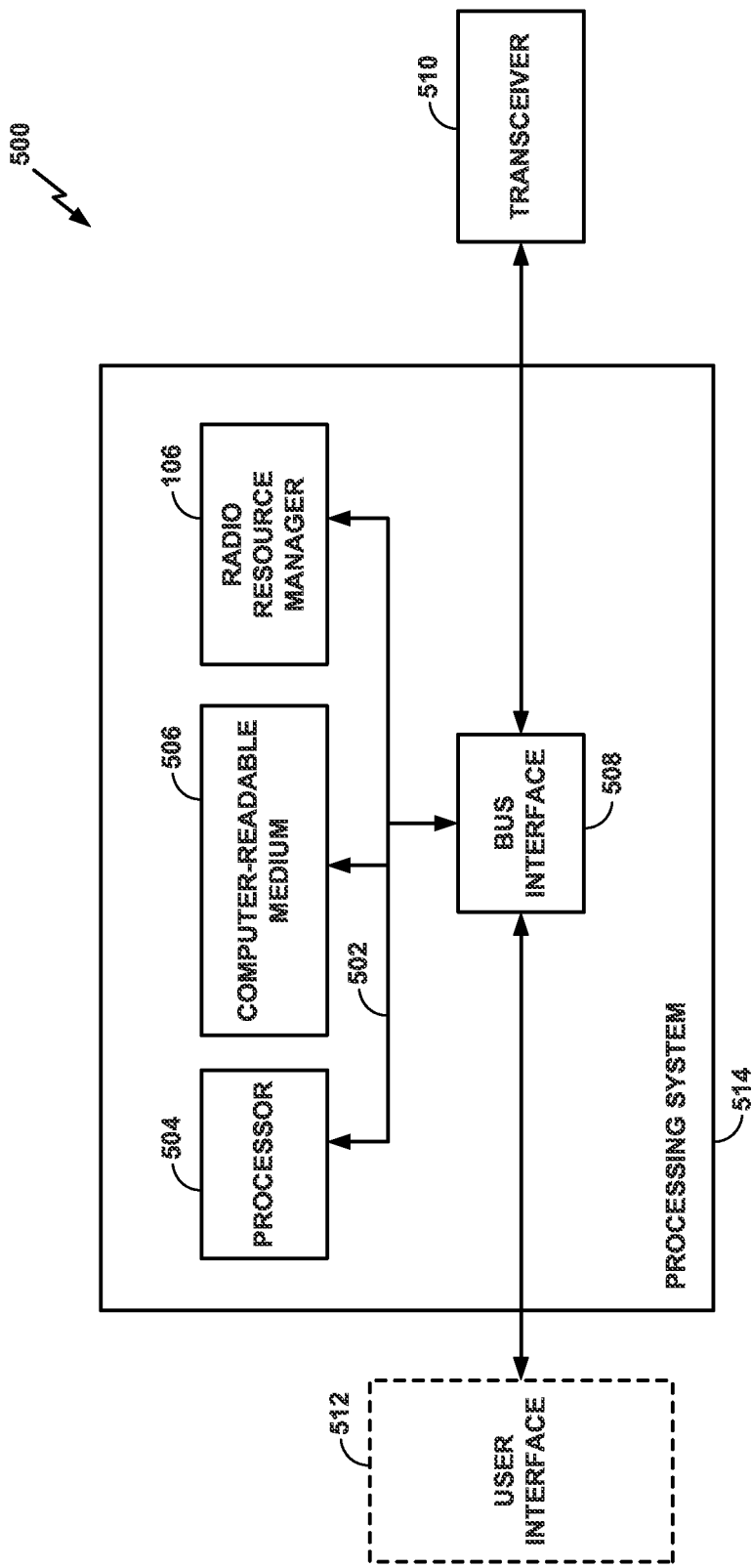
FIG. 5 is a diagram illustrating an example of a hardware implementation for an apparatus employing a processing system according to some embodiments.

FIG. 5 is a conceptual diagram illustrating an example of a hardware implementation for an apparatus 500 employing a processing system 514. In some examples, the processing system 514 may comprise a UE (e.g., UE 102 of FIG. 1) or a component of a UE (e.g., radio resource manager 106 of FIG. 1). In this example, the processing system 514 may be implemented with a bus architecture, represented generally by the bus 502. The bus 502 may include any number of interconnecting buses and bridges depending on the specific application of the processing system 514 and the overall design constraints. The bus 502 links together various circuits including one or more processors, represented generally by the processor 504, computer-readable media, represented generally by the computer-readable medium 506, and an radio resource manager 106 (see FIG. 1), which may be configured to carry out one or more methods or procedures described herein. In an aspect, the radio resource manager of FIG. 5 (and FIG. 1) may comprise hardware, software, or a combination of hardware and software. For example, computer-readable medium 506 may store instructions for performing the methods described herein associated with the radio resource manager 106 (or UE 102, generally), which may be executed by processor 504.

The bus 502 may also link various other circuits such as timing sources, peripherals, voltage regulators, and power management circuits, which are well known in the art, and therefore, will not be described any further. A bus interface 508 provides an interface between the bus 502 and a transceiver 510. The transceiver 510 provides a means for communicating with various other apparatus over a transmission medium. Depending upon the nature of the apparatus, a user interface 512 (e.g., keypad, display, speaker, microphone, joystick) may also be provided.

The processor 504 is responsible for managing the bus 502 and general processing, including the execution of software stored on the computer-readable medium 506. The software, when executed by the processor 504, causes the processing system 514 to perform the various functions described herein for any particular apparatus. The computer-readable medium 506 may also be used for storing data that is manipulated by the processor 504 when executing software. In addition, the processor 504 may be configured to implement the above-described aspects of methods 300 and 400 of FIGS. 3 and 4, respectively, and the detailed functional aspects of the claims below.

Figure 6:
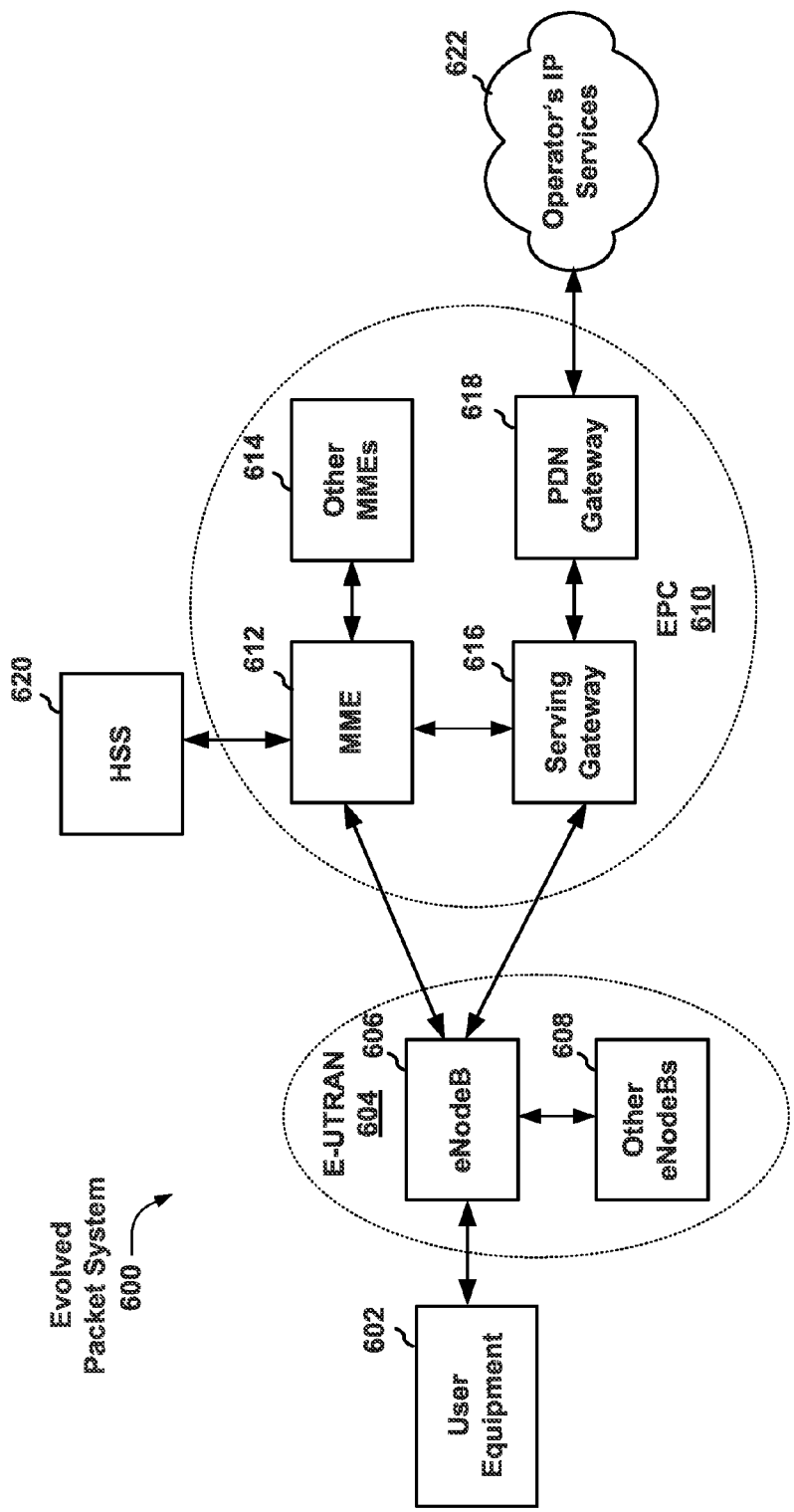
FIG. 6 is a block diagram conceptually illustrating an example of an LTE telecommunications system according to some embodiments.

FIG. 6 is a diagram illustrating an LTE network architecture 600 employing various apparatuses (e.g., UE 102, first RAT network entity 104, and/or second RAT network entity 120 of FIG. 1). The LTE network architecture 600 may be referred to as an Evolved Packet System (EPS) 600. The EPS 600 may include one or more user equipment (UE) 602 (which may represent UE 102 of FIG. 1 having a radio resource manager 106), an Evolved UMTS Terrestrial Radio Access Network (E-UTRAN) 604, an Evolved Packet Core (EPC) 610, a Home Subscriber Server (HSS) 620, and an Operator's IP Services 622. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 606 and other eNBs 608, one or more of which may represent first RAT network entity 104 and/or second RAT network entity 120 of FIG. 1. The eNB 606 provides user and control plane protocol terminations toward the UE 602. The eNB 606 may be connected to the other eNBs 608 via an X2 interface (i.e., backhaul). The eNB 606 may also be referred to by those skilled in the art as a base station, a base transceiver station, a radio base station, a radio transceiver, a transceiver function, a basic service set (BSS), an extended service set (ESS), or some other suitable terminology. The eNB 606 provides an access point to the EPC 610 for a UE 602. Examples of UEs 602 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 602 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 606 is connected by an S1 interface to the EPC 610. The EPC 610 includes a Mobility Management Entity (MME) 612, other MMEs 614, a Serving Gateway 616, and a Packet Data Network (PDN) Gateway 618. The MME 612 is the control node that processes the signaling between the UE 602 and the EPC 610. Generally, the MME 612 provides bearer and connection management. All user IP packets are transferred through the Serving Gateway 616, which itself is connected to the PDN Gateway 618. The PDN Gateway 618 provides UE IP address allocation as well as other functions. The PDN Gateway 618 is connected to the Operator's IP Services 622. The Operator's IP Services 622 include the Internet, the Intranet, an IP Multimedia Subsystem (IMS), and a PS Streaming Service (PSS).

Figure 7:
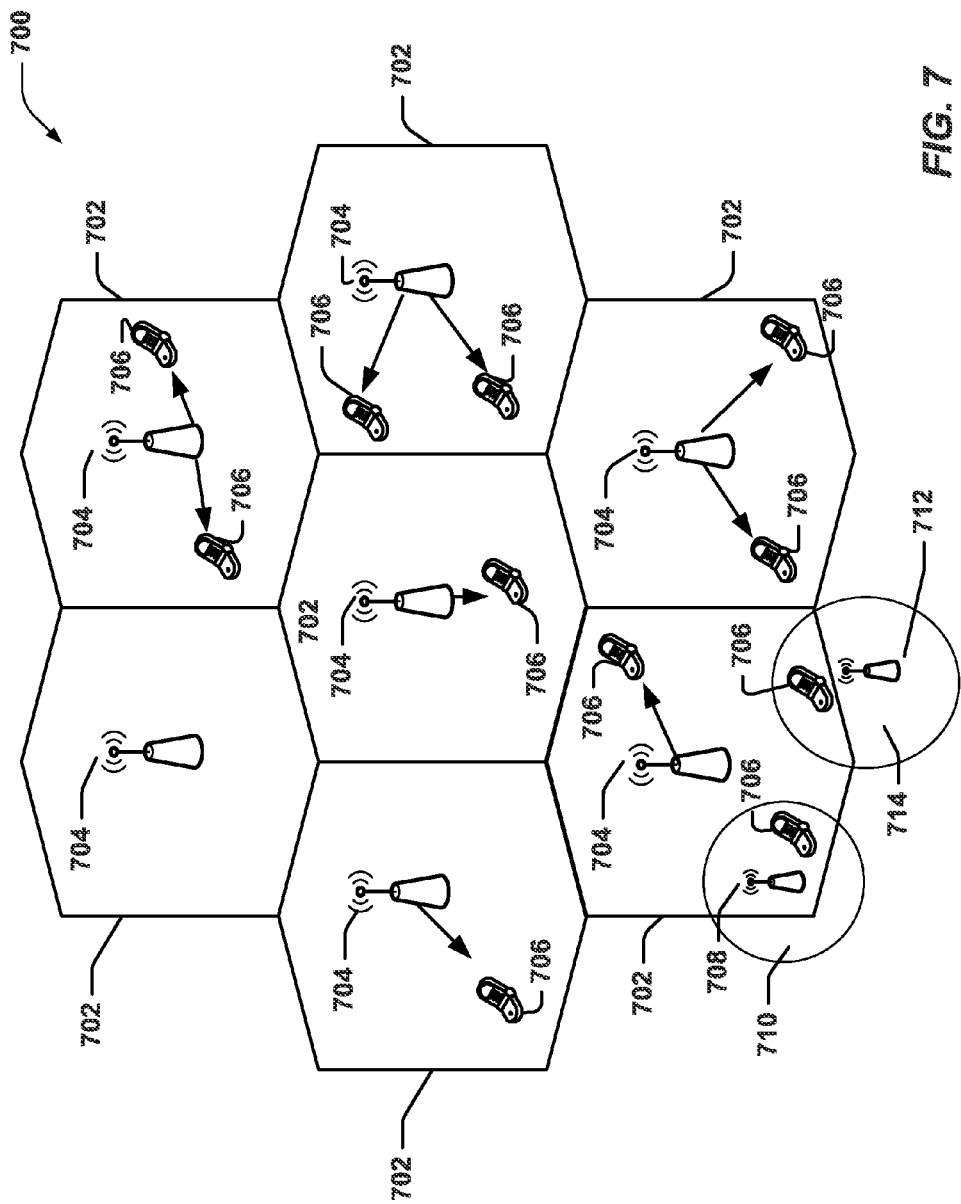
FIG. 7 is a diagram illustrating an example of an access network in an LTE network architecture according to some embodiments.

FIG. 7 is a diagram illustrating an example of an access network in an LTE network architecture. In this example, the access network 700 is divided into a number of cellular regions (cells) 702. In an aspect, at least one of the number of cells 702 may comprise the target cell associated with an idle mode handover of the UE 102 of the present disclosure. One or more lower power class eNBs 708, 712 may have cellular regions 710, 714, respectively, that overlap with one or more of the cells 702. The lower power class eNBs 708, 712 may be small cells (e.g., home eNBs (HeNBs)). A higher power class or macro eNB 704 is assigned to a cell 702 and is configured to provide an access point to the EPC 710 for all the UEs 706 in the cell 702. There is no centralized controller in this example of an access network 700, but a centralized controller may be used in alternative configurations. The eNB 704 is responsible for all radio related functions including radio bearer control, admission control, mobility control, scheduling, security, and connectivity to the serving gateway 716. In an aspect, one or more of the eNBs 704, 708, 712 may represent first RAT network entity 104 and/or second RAT network entity 120 of FIG. 1.

The modulation and multiple access scheme employed by the access network 700 may vary depending on the particular telecommunications standard being deployed. In LTE applications, orthogonal frequency-division multiplexing (OFDM) is used on the downlink (DL) and single-carrier frequency division multiple access (SC-FDMA) is used on the uplink (UL) to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards or radio access technologies (RATs) employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA (e.g., 1×RTT and other 1×RATs), such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA UMTS, LTE and GSM are described in documents from the 3GPP organization. CDMA2000 and UMB are described in documents from the 3GPP2 organization. These documents are hereby incorporated by reference. The actual wireless communication standard and the multiple access technology employed will depend on the specific application and the overall design constraints imposed on the system. Furthermore, referring to FIG. 1, each of first RAT 110 and second RAT 114 may be associated with one or more of these RATs and may be configured to communicate via these RAT standards with one or more of first RAT network entity 104 and second RAT network entity 120, which may also be configured to communicate according to the RAT(s) utilized by the subscriptions of UE 102.

The eNB 704 may have multiple antennas supporting multiple-input, multiple output (MIMO) technology. The use of MIMO technology enables the eNB 704 to exploit the spatial domain to support spatial multiplexing, beamforming, and transmit diversity.

Spatial multiplexing may be used to transmit different streams of data simultaneously on the same frequency. The data steams may be transmitted to a single UE 706 to increase the data rate or to multiple UEs 706 to increase the overall system capacity. This is achieved by spatially precoding each data stream and then transmitting each spatially precoded stream through a different transmit antenna on the downlink. The spatially precoded data streams arrive at the UE(s) 706 with different spatial signatures, which enables each of the UE(s) 706 to recover the one or more data streams destined for that UE 706. On the uplink, each UE 706 transmits a spatially precoded data stream, which enables the eNB 704 to identify the source of each spatially precoded data stream. In an aspect of the present disclosure, UE 706 may represent UE 102 of FIG. 1 having a radio resource manager 106.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 8:
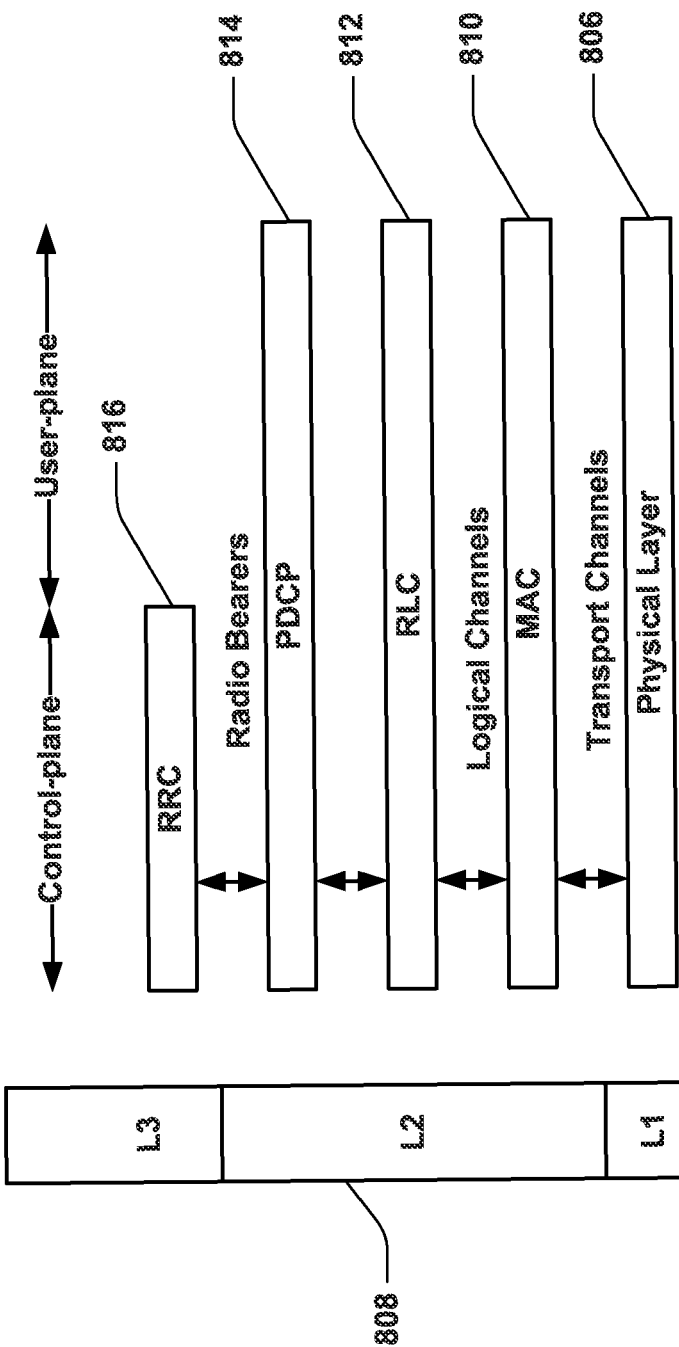
FIG. 8 is a diagram illustrating an example of a radio protocol architecture for the user and control plane according to some embodiments.

Turning to FIG. 8, the radio protocol architecture for a UE (e.g., UE 102 of FIG. 1 having a radio resource manager 106) and an eNB (e.g., first RAT network entity 104 or second RAT network entity 120 of FIG. 1) is shown with three layers: Layer 1, Layer 2, and Layer 3. Layer 1 is the lowest layer and implements various physical layer signal processing functions. Layer 1 will be referred to herein as the physical layer 806. Layer 2 (L2 layer) 808 is above the physical layer 806 and is responsible for the link between the UE and eNB over the physical layer 806.

In the user plane, the L2 layer 808 includes a media access control (MAC) sublayer 810, a radio link control (RLC) sublayer 812, and a packet data convergence protocol (PDCP) 814 sublayer, which are terminated at the eNB on the network side. Although not shown, the UE may have several upper layers above the L2 layer 808 including a network layer (e.g., IP layer) that is terminated at the PDN gateway 618 (see FIG. 6) on the network side, and an application layer that is terminated at the other end of the connection (e.g., far end UE, server, etc.).

The PDCP sublayer 814 provides multiplexing between different radio bearers and logical channels. The PDCP sublayer 814 also provides header compression for upper layer data packets to reduce radio transmission overhead, security by ciphering the data packets, and handover support for UEs between eNBs. The RLC sublayer 812 provides segmentation and reassembly of upper layer data packets, retransmission of lost data packets, and reordering of data packets to compensate for out-of-order reception due to hybrid automatic repeat request (HARQ). The MAC sublayer 810 provides multiplexing between logical and transport channels. The MAC sublayer 810 is also responsible for allocating the various radio resources (e.g., resource blocks) in one cell among the UEs. The MAC sublayer 810 is also responsible for HARQ operations.

In the control plane, the radio protocol architecture for the UE and eNB is substantially the same for the physical layer 806 and the L2 layer 808 with the exception that there is no header compression function for the control plane. The control plane also includes a radio resource control (RRC) sublayer 816 in Layer 3. The RRC sublayer 816 is responsible for obtaining radio resources (i.e., radio bearers) and for configuring the lower layers using RRC signaling between the eNB and the UE.

Figure 9:
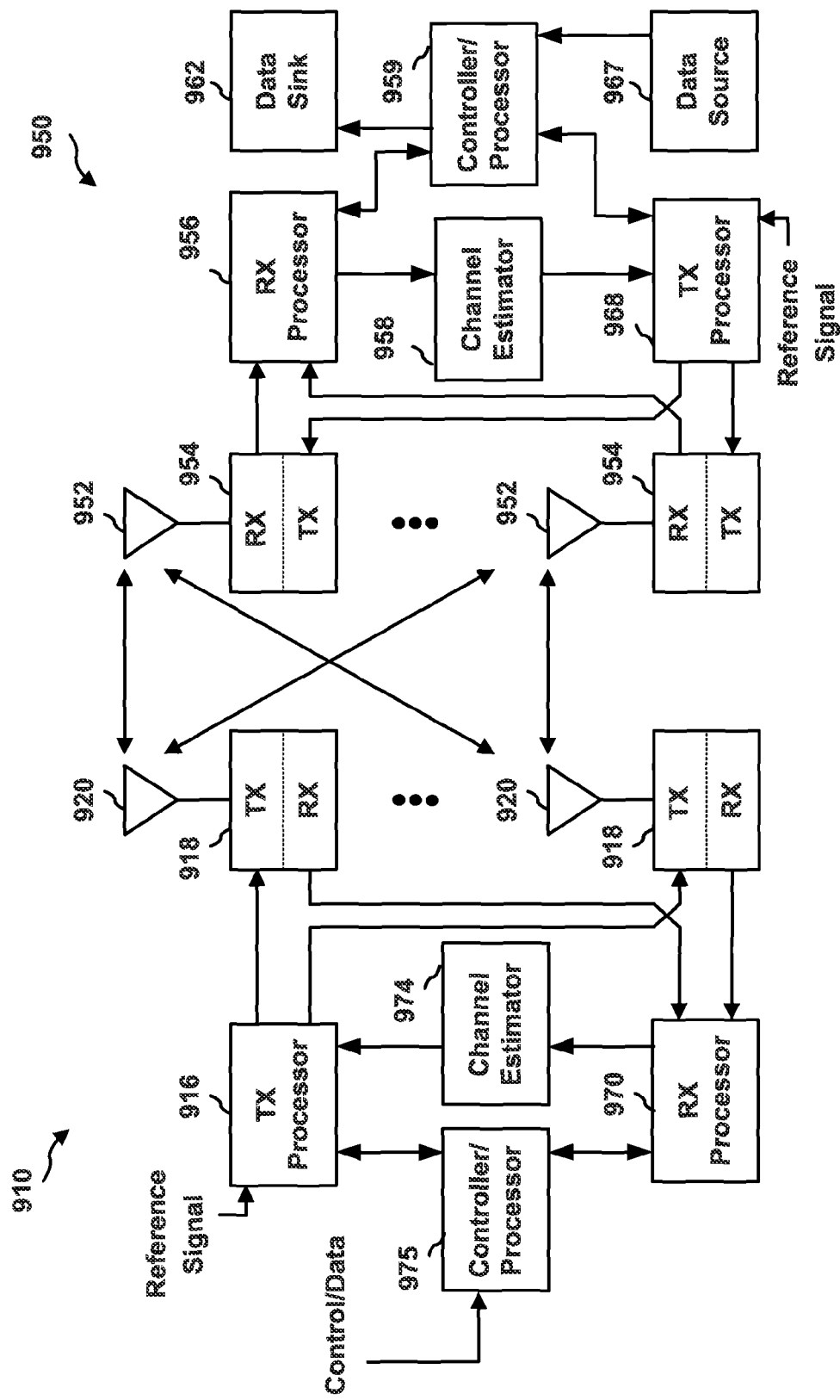
FIG. 9 is a diagram illustrating an example of an evolved Node B and user equipment in an access network according to some embodiments.

FIG. 9 is a block diagram of an eNB 910 in communication with a UE 950 in an access network. In an aspect, eNB 910 may represent first RAT network entity 104 and/or second RAT network entity 120 of FIG. 1 and UE 950 may represent UE 102 of FIG. 1 having a radio resource manager 106. In the downlink (DL), upper layer packets from the core network are provided to a controller/processor 975. The controller/processor 975 implements the functionality of the L2 layer described earlier in connection with FIG. 7. In the DL, the controller/processor 975 provides header compression, ciphering, packet segmentation and reordering, multiplexing between logical and transport channels, and radio resource allocations to the UE 950 based on various priority metrics. The controller/processor 975 is also responsible for HARQ operations, retransmission of lost packets, and signaling to the UE 950.

The transmit (TX) processor 916 implements various signal processing functions for the L1 layer (i.e., physical layer). The signal processing functions includes coding and interleaving to facilitate forward error correction (FEC) at the UE 950 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 974 may be used to determine the coding and modulation scheme, as well as for spatial processing. The channel estimate may be derived from a reference signal and/or channel condition feedback transmitted by the UE 950. Each spatial stream is then provided to a different antenna 920 via a separate transmitter 918TX. Each transmitter 918TX modulates an RF carrier with a respective spatial stream for transmission.

At the UE 950, each receiver 954RX receives a signal through its respective antenna 952. Each receiver 954RX recovers information modulated onto an RF carrier and provides the information to the receiver (RX) processor 956.

The RX processor 956 implements various signal processing functions of the L1 layer. The RX processor 956 performs spatial processing on the information to recover any spatial streams destined for the UE 950. If multiple spatial streams are destined for the UE 950, they may be combined by the RX processor 956 into a single OFDM symbol stream. The RX processor 956 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 910. These soft decisions may be based on channel estimates computed by the channel estimator 958. The soft decisions are then decoded and deinterleaved to recover the data and control signals that were originally transmitted by the eNB 910 on the physical channel. The data and control signals are then provided to the controller/processor 959.

The controller/processor 959 implements the L2 layer described earlier in connection with FIG. 8. In the UL, the control/processor 959 provides demultiplexing between transport and logical channels, packet reassembly, deciphering, header decompression, control signal processing to recover upper layer packets from the core network. The upper layer packets are then provided to a data sink 962, which represents all the protocol layers above the L2 layer. Various control signals may also be provided to the data sink 962 for L3 processing. The controller/processor 959 is also responsible for error detection using an acknowledgement (ACK) and/or negative acknowledgement (NACK) protocol to support HARQ operations. In an additional aspect, controller/processor 959 may be configured to perform the functions, methods, and other aspects of radio resource manager 106 described herein, for example, in the disclosure accompanying FIGS. 1-4, above.

In the UL, a data source 967 is used to provide upper layer packets to the controller/processor 959. The data source 967 represents all protocol layers above the L2 layer (L2). Similar to the functionality described in connection with the DL transmission by the eNB 910, the controller/processor 959 implements the L2 layer for the user plane and the control plane by providing header compression, ciphering, packet segmentation and reordering, and multiplexing between logical and transport channels based on radio resource allocations by the eNB 910. The controller/processor 959 is also responsible for HARQ operations, retransmission of lost packets, and signaling to the eNB 910.

Channel estimates derived by a channel estimator 958 from a reference signal or feedback transmitted by the eNB 910 may be used by the TX processor 968 to select the appropriate coding and modulation schemes, and to facilitate spatial processing. The spatial streams generated by the TX processor 968 are provided to different antenna 952 via separate transmitters 954TX. Each transmitter 954TX modulates an RF carrier with a respective spatial stream for transmission.

The UL transmission is processed at the eNB 910 in a manner similar to that described in connection with the receiver function at the UE 950. Each receiver 918RX receives a signal through its respective antenna 920. Each receiver 918RX recovers information modulated onto an RF carrier and provides the information to a RX processor 970. The RX processor 970 implements the L1 layer.

The controller/processor 959 implements the L2 layer described earlier in connection with FIG. 8. In the UL, the control/processor 959 provides demultiplexing between transport and logical channels, packet reassembly, deciphering, header decompression, control signal processing to recover upper layer packets from the UE 950. Upper layer packets from the controller/processor 975 may be provided to the core network. The controller/processor 959 is also responsible for error detection using an ACK and/or NACK protocol to support HARQ operations.

By way of example, various aspects of the present disclosure may be extended to other UMTS systems such as W-CDMA, TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods or methodologies described herein may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of managing a user equipment (UE), the method comprising:
   starting, at the UE, a timer having a time period shorter than an overhead message collection period, the time period being a period during which a first radio access technology (RAT) of the UE attempts to obtain a portion of overhead messages from a cell;
   obtaining, at a radio resource of the UE via the first RAT and during a first time period corresponding to the time period of the timer, a first portion of the overhead messages from the cell;
   determining that the timer has expired;
   handing over the radio resource from the first RAT to a second RAT of the UE upon determining that the timer has expired;
   handing over the radio resource back to the first RAT after a sleep duration associated with the first RAT;
   obtaining, at the radio resource via the first RAT and during a second time period corresponding to the time period of the timer, a second portion of the overhead messages from the cell; and
   aggregating the first portion of the overhead messages with the second portion of the overhead messages.

2. The method of claim 1, wherein the sleep duration is based on an overhead message transmission periodicity associated with the cell.

3. The method of claim 1, further comprising:
   determining that the overhead messages for the cell have been obtained by the UE; and
   reverting to a maintenance overhead message obtaining procedure based on determining that the overhead messages have been obtained.

4. The method of claim 1, further comprising:
   receiving, via the radio resource, a cell handoff indication message indicating that the first RAT is to be handed off; and
   wherein starting the timer comprises starting the timer based upon receiving the cell handoff indication message.

5. The method of claim 1, wherein each of the first time period and the second time period is less than a radio link failure time period associated with the second RAT.

6. The method of claim 1, further comprising forcing the first RAT to enter a sleep state based on determining that the timer has expired.

7. The method of claim 1, wherein the first portion of the overhead messages is different from the second portion of the overhead messages.

8. An apparatus for managing a user equipment (UE), the apparatus comprising:
   a radio resource manager, comprising hardware for managing a radio resource of the UE, the radio resource manager configured to:
      start, at the UE, a timer having a time period shorter than an overhead message collection period, the time period being a period during which a first radio access technology (RAT) of the UE attempts to obtain a portion of overhead messages from a cell;
      obtain, from the radio resource via the first RAT and during a first time period corresponding to the time period of the timer, a first portion of the overhead messages from the cell;
      determine that the timer has expired;
      hand over the radio resource from the first RAT to a second RAT of the UE upon determining that the timer has expired;
      hand over the radio resource back to the first RAT after a sleep duration associated with the first RAT;
      obtain, at the radio resource via the first RAT and during a second time period corresponding to the time period of the timer, a second portion of the overhead messages from the cell; and
      aggregate the first portion of the overhead messages with the second portion of the overhead messages.

9. The apparatus of claim 8, wherein the sleep duration is based on an overhead message transmission periodicity associated with the cell.

10. The apparatus of claim 8, wherein the radio resource manager is further configured to:
    determine that the overhead messages for the cell have been obtained by the UE; and
    revert to a maintenance overhead message obtaining procedure based on determining that the overhead messages have been obtained.

11. The apparatus of claim 8, wherein the radio resource manager is further configured to:
    receive, via the radio resource, a cell handoff indication message indicating that the first RAT is to be handed off; and
    wherein starting the timer comprises starting the timer based upon receiving the cell handoff indication message.

12. The apparatus of claim 8, wherein each of the first time period and the second time period is less than a radio link failure time period associated with the second RAT.

13. The apparatus of claim 8, wherein the radio resource manager is further configured to force the first RAT to enter a sleep state upon determining that the timer has expired.

14. The apparatus of claim 8, wherein the first portion of the overhead messages is different from the second portion of the overhead messages.

15. A non-transitory computer-readable medium storing instructions, that when executed by a processor, cause the processor to perform operations, comprising:
    start, at the UE, a timer having a time period shorter than an overhead message collection period, the time period being a period during which a first radio access technology (RAT) of the UE attempts to obtain a portion of overhead messages from a cell;
    obtain, with the first RAT at a radio resource of the UE and during a first time period corresponding to the time period of the timer, a first portion of the overhead messages from the cell;
    determine that the timer has expired;
    hand over the radio resource from the first RAT to a second RAT of the UE upon determining that the timer has expired;
    hand over the radio resource back to the first RAT after a sleep duration associated with the first RAT;
    obtain, with the first RAT at the radio resource of the UE and during a second time period corresponding to the time period of the timer, a second portion of the overhead messages from the cell; and
    aggregate the first portion of the overhead messages with the second portion of the overhead messages.

16. The computer-readable medium of claim 15, wherein the sleep duration is based on an overhead message transmission periodicity associated with the cell.

17. The computer-readable medium of claim 15, wherein the computer-readable medium stores instructions, that when executed by the processor, cause the processor to:
    determine that the overhead messages for the cell have been obtained by the UE; and
    revert to a maintenance overhead message obtaining procedure based on determining that the overhead messages have been obtained.

18. The computer-readable medium of claim 15, wherein the computer-readable medium stores instructions, that when executed by the processor, cause the processor to:
    receive, via the radio resource, a cell handoff indication message indicating that the first RAT is to be handed off; and
    wherein starting the timer comprises starting the timer based upon receiving the cell handoff indication message.

19. The computer-readable medium of claim 15, wherein each of the first time period and the second time period is less than a radio link failure time period associated with the second RAT.

20. The computer-readable medium of claim 15, wherein the computer-readable medium stores instructions, that when executed by the processor, cause the processor to force the first RAT to enter a sleep state upon determining that the timer has expired.

21. The computer-readable medium of claim 15, wherein the first portion of the overhead messages is different from the second portion of the overhead messages.

* * * * *